United States Patent [19]

Kobayashi

[11] 4,326,150
[45] Apr. 20, 1982

[54] CATHODE RAY TUBE DEVICE FOR DISPLAY SYSTEM

[75] Inventor: Hiroo Kobayashi, Nagaokakyo, Japan

[73] Assignee: Mitsubishi Denki Kabushiki Kaisha, Tokyo, Japan

[21] Appl. No.: 132,163

[22] Filed: Mar. 20, 1980

[30] Foreign Application Priority Data

Mar. 24, 1979 [JP] Japan .................................. 54-35917
Mar. 24, 1979 [JP] Japan .................................. 54-35918

[51] Int. Cl.³ ............................................. G09F 13/00
[52] U.S. Cl. ..................................... 315/325; 40/581; 315/9; 340/720; 362/231
[58] Field of Search ............... 313/112, 474, 478, 483, 313/495; 315/8.6, 9, 324, 325; 362/231; 40/542, 581; 340/366 CA, 703, 720, 752, 781; 358/56, 64

[56] References Cited

U.S. PATENT DOCUMENTS 3,299,303  1/1967  Kreuder .............................. 313/495
3,961,365  6/1976  Payne et al. .......................... 358/56

*Primary Examiner*—Eugene R. LaRoche
*Attorney, Agent, or Firm*—Wenderoth, Lind & Ponack

[57] ABSTRACT

Each of picture elements on a color display system is formed of a triad of small monochromatic cathode ray tubes luminescing in red, green and blue in response to unfocused electron beams from respective electron guns and disposed in a cylindrical housing. The tubes include identical components interconnected through respective leads extending externally of the housing. Alternatively, the housing may additionally include a driving source having a high voltage generator for applying an anode voltage to the tubes and leads extending externally of the housing which serve to energize the generator and tube heaters and to apply control signals to the tubes.

12 Claims, 6 Drawing Figures

CATHODE RAY TUBE DEVICE FOR DISPLAY SYSTEM

BACKGROUND OF THE INVENTION

This invention relates to a cathode ray tube device used with a display system suitable for a giant color display.

In the conventional construction of giant display systems, for example, electric light display boards used with baseball fields, apparatus for displaying advertising pictures or the like on the roof top or wall surface of buildings, etc., pictures have been formed by selectively effecting the turn-on and-off of a multitude of colored electric lamps arranged in a predetermined pattern. Such display systems have had many difficult problems to be solved. For example, it could be first mentioned that the color retention is poor. This has originally resulted from the fact that the electric lamps bring out colors by having their filaments heated to red heat and assume the red or while orange color. Therefore, in order to produce separately three colors or red, green and blue required for colored pictures to be reproduced, light beams emitted from the respective filaments have been picked up after colored glass plates or the like have been used to separate the light beams into red, green and blue components and selecting them. However, as the electric lamp serving as a light source is naturally little in its quantity of the green component and particularly of the blue component, it has been very difficult to pick up those colors. Also, when the electric lamps arranged as described above are selectively turned on and off, the brightness modulation of each picture element or each electric lamp has been required to rely on means for turning a current applied to the mating filament on and off or of rendering the applied current variable. Furthermore such means has had a frequency response as low as 10 hertz or less and, in addition, the intermediate color tone has been permitted to be displayed only in two or three steps. Furthermore, electric lamps on the order of 12 watts have been generally employed and each of display systems has included, for example, several ten thousand of such electric lamps. This has encountered many problems in a power consumption, heat generated by the individual electric lamps, the reliability, maintenance etc.

Accordingly, it is a general object of the present invention to solve the problems as described above.

It is an object of the present invention to provide a new and improved cathode ray tube device for a display system excellent in color retention, and extremely low in power consumption, resulting in the high performance and the power saving type.

It is another object of the present invention to provide a new and improved cathode ray tube device for a display system high in both security and reliability and easy in maintenance.

SUMMARY OF THE INVENTION

The present invention provides a cathode ray tube device used with a display system including of light sources arranged in a predetermined pattern to emit light in a plurality of colors, said device comprising one set of cathode ray tubes each including a monochromatic phosphor screen and an electron guns for generating a non-convergent or an unfocused beams of electrons, the set of cathode ray tubes luminescing in at least red, green and blue in response to the unfocused beams of electrons respectively, a cylindrical housng having the set of cathode ray tubes fixedly disposed therein, and connecting means for connecting together common electrodes of the cathode ray tubes, the connecting means extending externally of the cylindrical housing whereby the cathode ray tube device forms each of the light sources.

In a preferred embodiment of the present invention, the cylindrical housing may includes a triad of the cathode ray tubes luminescing in red, green and blue respectively and an electric source for supplying an anode voltage to the cathode ray tubes.

Also the connecting means may include a pair of leads having applied thereacross a low voltage of not higher than 100 volts of the AC or DC type and a lead for supplying a driving signal to each of the cathode ray tubes.

BRIEF DESCRIPTION OF THE INVENTION

The present invention will become more readily apparent from the following detailed description taken in conjunction with the accompanying drawings in which.

DESCRIPTION OF THE PREFERRED EMBODIMENTS

Figure 1:
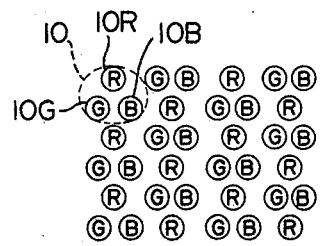
FIG. 1 is a fragmental plan view, in an enlarged scale, of an array of cathode ray tubes disposed in a color display system according to the present invention.

Reffering now to FIG. 1 of the drawings, there is illustrated a portion of an array of small-sized cathode ray tubes arranged in accordance with the present invention. In the arrangement illustrated a triad of small-sized red, green and blue cathode ray tubes 10R, 10G and 10B respectively are disposed at vertices of a small equilateral triangle to form one picture element of a display system encircled by a dotted circle 10. A multitude of such picture elements 10 are arranged in rows and columns to form a display surface. In FIG. 1, the picture elements in each column are shown as including the red cathode ray tubes 10R reversed in position from those included in the adjacent column.

Figure 2:
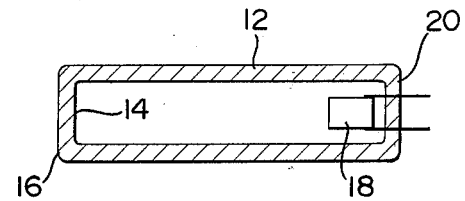
FIG. 2 is a longitudinal sectional view of a small-sized monochromatic cathode ray tube which may be used with the arrangement shown in FIG. 1.

Each of the cathode ray tubes 10R, 10G or 10B is of such a construction as shown in FIG. 2. As shown, the cathode ray tube includes an evacuated envelope 12 in the form of a hollow cylinder closed at both ends, a front plate 16 formed of a phosphor 14 applied to the inner surface of one end, in this case, the lefthand end as viewed in FIG. 2 of the envelope 12 and a electron gun 18 disposed within the evelope 12 adjacent to the other or righthand end thereof. The electron gun 18 includes electrodes (not shown) applied with voltages as required and a stem 20 for closing the other or righthand end of the envelope 12.

The phosphor 14 is composed of a monochromatic phosphor luminescing in color selected among red, green and blue colors. For example, the phosphor 14 on the red cathode ray tube 10R is composed of a monochromatic phosphor luminescing in red. Also the electron gun 18 generates an unfocused beam of electrons (not shown) sufficient to irradiate that portion of the inner end surface of the enclosure 12 coated with the monochromatic phosphor 14 to cause the phosphor 14 to luminesce in its selected color.

In color display systems including the cathode ray tubes as described above, the beams of electrons from the electron guns 18 of the cathode ray tubes 10R, 10G and 10B can be modulated to effect the ON-OFF control of associated color development. This is applicable to a change in luminescence.

Also the resulting luminescent image has its frequency response as determined by the afterglow characteristic of the phosphor 14 and phosphors used with color display equipment, as described above, have afterglow times of not longer than 1 millisecond. Therefore, even if pictures should switch at a frequency of not less than 60 hertz, no problem occurs. This is combined with the fact that the beam of electrons can easily be modulated to permit the intermediate color tone to be finely reproduced.

Regarding the power consumption per each cathode ray tube, it is said that, in color display systems used during the day time, a green luminance is required to be on the order of 1000 foot-lamberts. In order to give this value of the green luminance, the cathode ray tubes as described above were operated under the following operating conditions:

| | |
|---|---|
| Anode Voltage: | 10 kilovolts |
| Anode Current: | 25 to 30 microamperes |
| First Grid Voltage: | 0 volt |
| Cathode Voltage: | 0 to 30 volts |
| Heater voltage: | 12 volts |
| Heater Current: | 0.07 ampere |
| Effective Diameter of Phosphor Screen: | 20 millimeters |
| Current Density on Phosphor Screen: | about 8 to 10 microamperes per square centimeter |

Under these circumstances, each of the cathode ray tube had an electric power of from 0.25 to 0.3 watt consumed by its anode electrode and that of 0.84 watt consumed by its heater. Thus the power consumption per each cathode ray tube totalled about 1.1 watts.

From the foregoing it is seen that, by constructing giant color display systems including, as light sources, cathode ray tubes such as described above, each of light sources having the desired color can be provided while it is possible not only to display animations and reproduce natural colors including intermediate color tones but also the power consumption can be sharply reduced.

Figure 3:
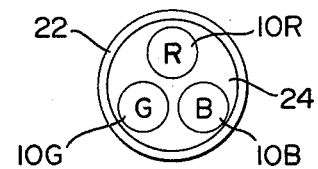
FIG. 3 is a front plan view of a cathode ray tube device disposed in the arrangement shown in FIG. 1.

The cathode ray tube device used with those color display system is preferably constructed such as shown in FIG. 3. The arrangement illustrated comprises a cylindrical housing 22 open at one end, and a triad of red, green and blue cathode ray tubes 10R, 10G and 10B respectively disposed within the housing 22 in the manner as described above in conjunction with FIG. 1 to include the respective monochromatic phosphor screens exposed to the open end of the housing 22 and flush with one another. Then the triad of cathode ray tubes are fixed in place within the housing 22 by inserting an elastic material 24 such as silicone rubber into interspaces between the outer surfaces of the cathode ray tubes and between the latter and the inner surface of the housing 22. The cathode ray tube device of the present invention thus assembled forms have a single picture element constructed into a unitary structure. Therefore, the cathode ray tube devices or picture elements can be easily handled.

Figure 4:
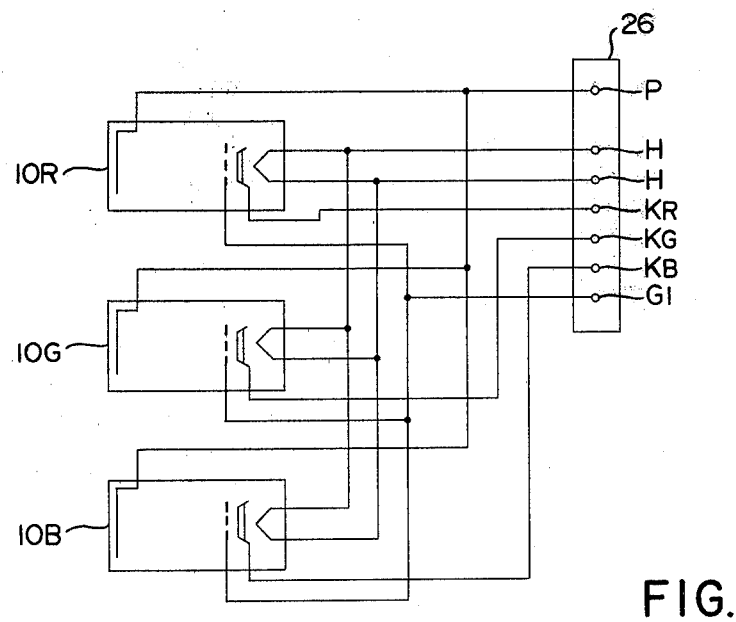
FIG. 4 is a circuit diagram of the arrangement shown in FIG. 3.

In addition, the triad of red, green and blue cathode ray tubes are electrically interconnected so that each set of electrodes put at a common potential is connected together as shown in FIG. 4. In FIG. 4 the red, green and blue cathode ray tubes 10R, 10G and 10B respectively include their phosphor screens connected together to a terminal P on a socket 26, their first grid electrodes connected together to a terminal $G_1$ on the socket 26 and their heaters connected together across a pair of terminals H on the socket 26. However, the red, green and blue cathode ray tubes 10R, 10G and 10B include their cathode electrodes connected to terminals $K_R$, $K_G$ and $K_B$ on the socket 26 respectively.

By supplying electric power and a control signal to each of the triads of red green and blue cathode ray tubes through connecting means including the socket 26 as shown in FIG. 4, the picture elements can be very easy to be installed on an associated color display system and it is easy to effect their maintenance.

The inner surface of the housing 22 is preferably formed of a mirror surface or a light reflecting surface in order to deliver the luminescence from the cathode ray tubes 10R, 10G and 10B as much as possible in front of the housing 22 through the open end thereof.

Also, in order that the outer surface of the housing 22 absorbs and interrupts light, the same is advantageously rendered, for example, black. This measure prevents light from the black housing from reaching that housing forming the adjacent picture element and alleviates the effect of external light. This results in an increase in contrast of displayed pictures.

Figure 5:
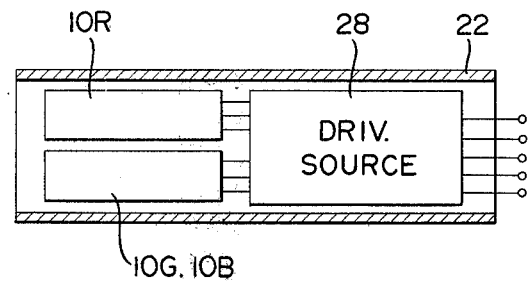
FIG. 5 is a view similar to FIG. 2 but illustrating a modification of the present invention.

Referring now to FIG. 5 there is illustrated a modification of the present invention. In the arrangement illustrated, the cylindrical housing 22 is opened at both ends and includes the triad of red, green and blue cathode ray tubes 10R, 10G and 10B respectively disposed within one half, in this case the lefthand half thereof as viewed in FIG. 5 and in the same manner as described in conjunction with FIG. 3 and a driving electric source 28 disposed in the other or righthand half thereof and electrically connected to the cathode ray tubes 10R, 10G and 10B through leads extended and sealed through the respective stems (not shown). The driving source 28 includes five leads extending through the other or righthand end of the housing 22.

Figure 6:
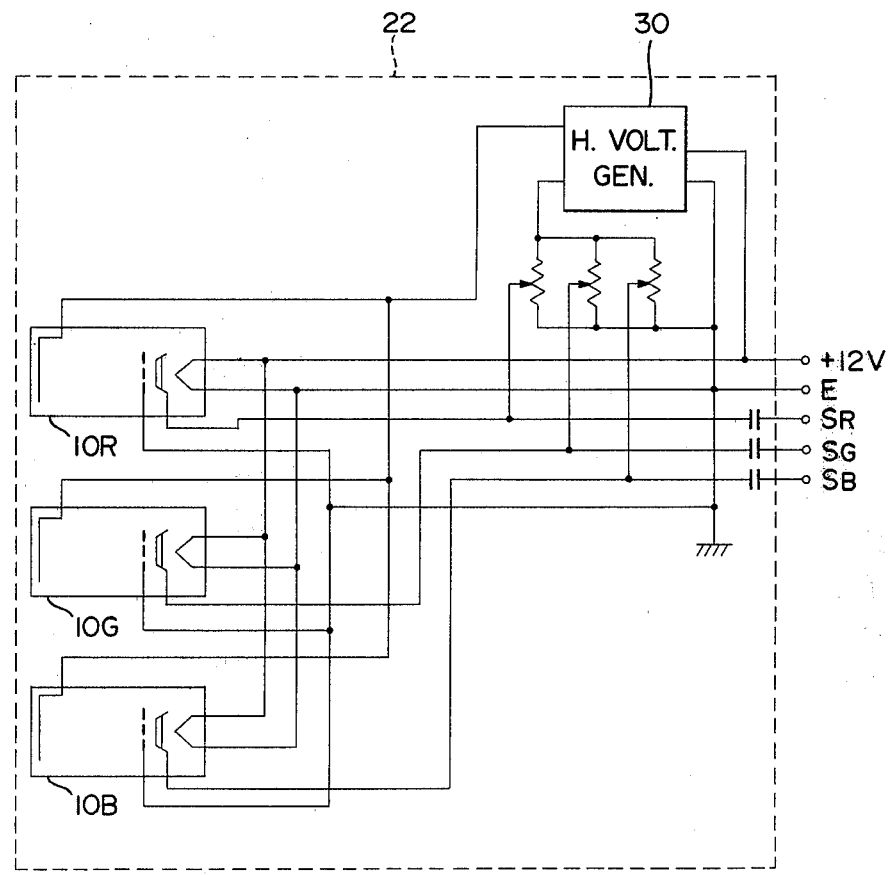
FIG. 6 is a wiring diagram of a circuit suitable for the arrangement shown in FIG. 5.

FIG. 6 shows, by way of example, a circuit included in the driving source 28. As shown in FIG. 6, the triad of the cathode ray tubes 10R, 10G and 10B include their phosphor screens connected together to one output of a high voltage generator 30 for supplying an anode voltage to those cathode ray tubes, their first grid electrodes connected to ground and also to one input to the generator 30 and their cathode electrodes connected to movable taps on three resistors connected in parallel circuit relationship across the other output of the generator 30 and ground. The cathode electrodes of the tubes 10R, 10G and 10B are also connected to control terminals $S_R$, $S_G$ and $S_B$ through individual capacitors respectively and the heaters of all the three tubes are connected together across a pair of source terminals labelled +12V and E. Those terminals are shown in FIG. 6 as being disposed externally of the housing 22.

In the arrangement shown in FIGS. 5 and 6, the cylindrical housing 22 are required only to be connected to exterior through five leads. More specifically, the housing 22 has two leads connected to a pair of positive and negative source terminals +12V and E respectively for supplying a voltage to the heaters of the red, green and blue cathode ray tubes 10R, 10G and 10B respecitvely to heat the heaters, and three leads connected to the control terminals $S_K$, $S_G$ and $S_B$ respectively to which driving signals are applied selectively to turn the triad of cathode ray tubes on and off and also modulate the luminances thereof. Furthermore, the heating voltage applied to the cathode ray tubes may be of either the DC or AC type and has a magnitude of not higher than 100 volts, and equals 12 volts DC in the example illustrated, while the driving signals may be at low voltage of about 12 volts. This eliminates the necessity of using leads put at moderate and/or high voltages.

Accordingly it is seen that, in the arrangement shown in FIGS. 5 and 6, both the security and reliability can be improved and also the maintenance can be easily effected.

In summary, the present invention provides a cathode ray tube device for a display system which is excellent in color retention and extremely low in power consumption resulting in high performance and power savings.

While the present invention has been illustrated and described in conjunction with a few preferred embodiments thereof, it is to be understood that numerous changes and modulations may be resorted to without departing from the spirit and scope of the present invention. For example, the present invention is equally applicable to black and white display systems. In the latter case, a single cathode ray tube luminescing in white may be fixedly inserted into the cylindrical housing along with a driving electric source including at least a high voltage generator to form one picture element into a unitary structure.

What is claimed is:

1. A cathode ray tube device used with a display system including a multitude of light sources arranged in a predetermined pattern to emit light in a plurality of colors, said device comprising one set of cathode ray tubes each including a monochromatic phosphor screen and an electron gun for generating an unfocused beam of electrons, said set of cathode ray tubes luminescing in at least red, green and blue in response to said unfocused beams of electrons respectively, a cylindrical housing having said set of cathode ray tubes fixedly disposed therein, and connecting means for connecting together common electrodes of said cathode ray tubes, said connecting means extending externally of said cylindrical housing whereby said cathode ray tube device forms each of said light sources.

2. A cathode ray tube device for a display system as claimed in claim 1 wherein said cylindrical housing includes a triad of said cathode ray tubes luminescing in red green and blue respectively and an electric source for supplying an anode voltage to said cathode ray tubes.

3. A cathode ray tube device for a display system as claimed in claim 1 or 2 wherein said cylindrical housing includes an inner surface formed of a light reflecting surface.

4. A cathode ray tube device for a display system as claimed in claim 1 or 2 wherein said cylindrical housing includes an outer surface so as to absorb and interrupt light.

5. A cathode ray tube device for a display system as claimed in claim 1 wherein said connecting means includes a pair of leads having applied thereacross a low voltage of not higher than 100 volts of the AC or DC type and a lead for supplying a driving signal to each of said cathode ray tubes.

6. A display system comprising a plurality of light source means disposed in a predetermined pattern on a display panel, each of said plurality of light source means including a set of at least three high voltage cathode ray tubes including monochromatic phosphor screens for luminescing in luminescent red, green and blue colors respectively and respective electron guns for generating unfocussed beams of electrons directed onto associated ones of said screens, each of said unfocussed beams of electrons being arranged to fall on the associated screen to cause same to luminesce in a color assigned thereto, and control means for controlling the luminescent state of an associated one of said at least three high voltage cathode ray tubes in each of said light source means, so as to thereby change the luminescent light emitted from said high voltage cathode ray tubes to display a color pattern on said display panel.

7. A display system as claimed in claim 6, wherein each of said high voltage cathode ray tubes includes an anode electrode supplied with a high voltage on the order of 10 kilovolts.

8. A display system as claimed in claim 7, wherein a common high voltage generator means is provided to supply said high voltages to said anode electrodes of said at least three high voltage cathode ray tubes disposed in each of said light source means.

9. A display system as claimed in claim 8, wherein each of said at least three high voltage cathode ray tubes disposed in each of said light source means includes, a cathode electrode, a grid electrode and a cathode heater, and wherein a plurality of common potential sources are connected to said anode electrodes, said cathode heaters and said grid electrodes of said high voltage cathode ray tubes respectively and said cathode electrode of each of said high voltage cathode ray tubes is controlled independently of the cathode electrodes of the remainder of said cathode ray tubes.

10. A display system as claimed in claim 6, wherein each of said plurality of light source means includes a cylindrical housing and has said at least three high voltage cathode ray tubes disposed in said cylindrical housing.

11. A display system as claimed in claim 6, wherein said monochromatic cathode ray tubes for luminescing in red, green and blue are disposed at angular equal intervals with respect to a point of 120 degrees.

12. A display system as claimed in claim 6, wherein said plurality of light source means are regularly arranged in rows and columns to from a matrix.

* * * * *